Jan. 2, 1951  H. W. SCHULZE ET AL  2,536,613
OVEN HEATING UNIT
Filed Aug. 15, 1947
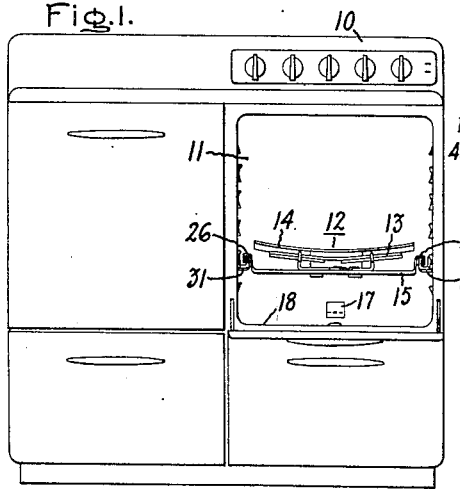
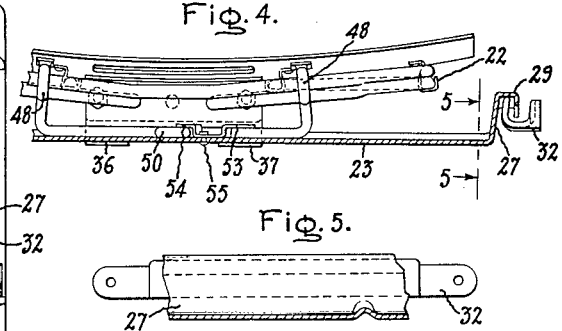
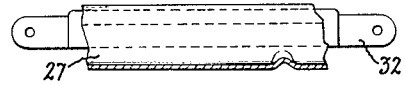
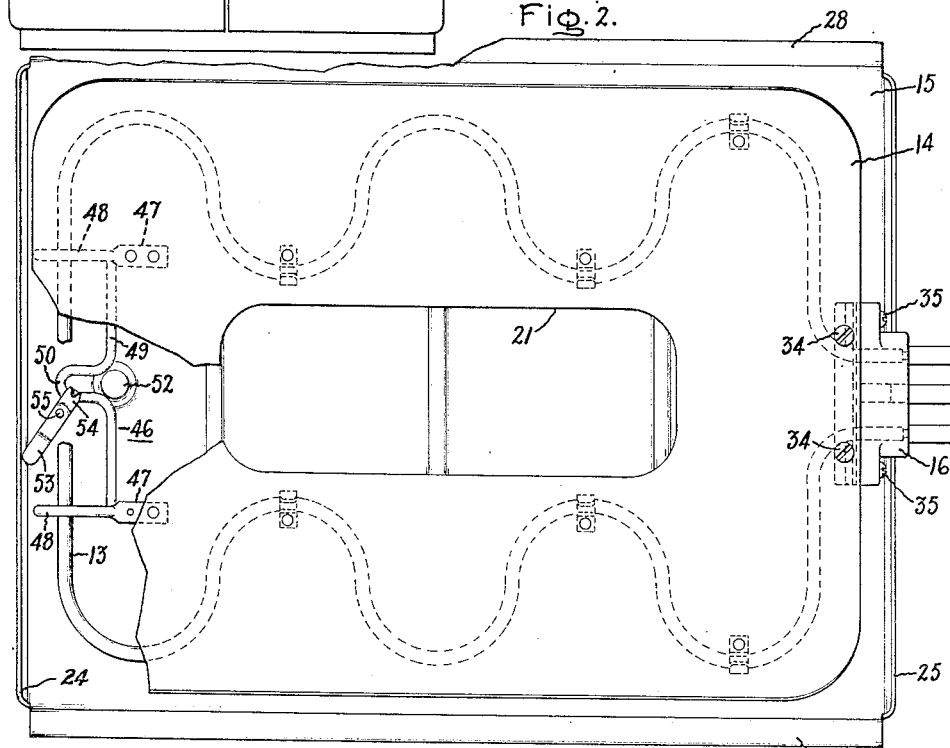
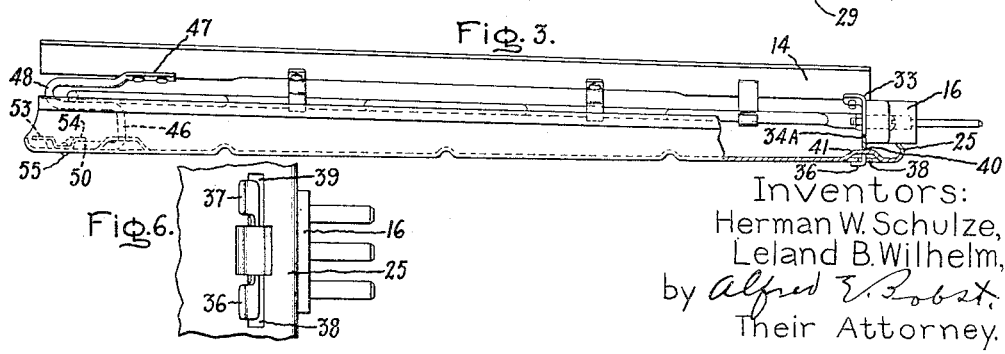
Inventors:
Herman W. Schulze,
Leland B. Wilhelm,
by Alfred E. Pobst
Their Attorney.

Patented Jan. 2, 1951

2,536,613

UNITED STATES PATENT OFFICE 2,536,613

OVEN HEATING UNIT

Herman W. Schulze, Elmwood Park, and Leland B. Wilhelm, Chicago, Ill., assignors to Hotpoint Inc., Chicago, Ill., a corporation of New York Application August 15, 1947, Serial No. 768,920

7 Claims. (Cl. 219—35)

The present invention relates to an oven heating unit and more particularly to a composite heating unit including a heating element, heat shield and baffle for electric ranges.

In the past, electric ranges have been provided with a lower or baking unit which was movable to an intermediate position within the oven to obtain a smaller "speed" oven for more economical cooking of small quantities of food. In the use of such devices, a separate baffle was employed below the unit when in the intermediate position. Such baffles when not in use were inconvenient to store and the conversion of the oven from the regular to the "speed" size was rendered inconvenient by the fact that the heating unit and the baffle had to be separately moved and positioned.

An object of the present invention is to provide a combination oven heating unit including a baffle which is movable with the unit into a lower or full-oven position and into an intermediate or speed-oven position.

A further object of the invention is to provide an inexpensive, rugged compact heating unit including heating element or elements, a heat shield and a baffle.

Another object of the invention is to provide an oven heating unit including a baffle which effectively partitions the oven when the unit is in an intermediate position above the floor of the oven and which when the unit is in either the lower or intermediate position, forms a removable, easily cleanable bottom or floor for the oven cavity.

A further object of the invention is to provide a new and improved oven heating unit comprising a heating element, heat shield and an oven-partitioning baffle removably attached to the remaining portion of said unit.

Other objects of the invention will become apparent from the following description of the invention when taken in connection with the accompanying drawing in which:

Fig. 1 is an elevational view of an electric range illustrating an oven containing the combination heating unit of the present invention;

Fig. 2 is a top plan view, partially broken away of the heating unit, and drawn to a larger scale than in Fig. 1;

Fig. 3 is a side view of said unit, partially in section;

Fig. 4 is a front elevational view partly in section of part of the heating unit;

Fig. 5 is a section on line 5—5 of Fig. 4; and

Fig. 6 is a bottom view of part of the right hand portion of the unit as shown in Fig. 3.

Referring to the drawing, there is shown an electric range 10 including an oven 11 and a combination heating unit 12 including a heating element 13, a heat shield 14 and a baffle 15, and a connector 16, the said heating unit being adapted to be plugged into either of two terminal blocks, one of which is in the rear wall of the oven adjacent the floor 18 thereof and is indicated in Fig. 1 by numeral 17 and the other of which is also in the rear wall of the oven at a point vertically above block 17 and behind the heating unit 12 in the position shown in Fig. 1.

In the illustrated embodiment of the invention, the heat shield 14 includes a centrally located aperture 21 to ensure the air heated by element 13 passing generally upwardly along the side walls of the oven and downwardly through the aperture where it is deflected by baffle 15. The heating element 13 which in this case is a sheathed resistor unit is secured to the lower side of the shield 14 about the aperture 21 by any suitable means such as brackets 22, the element 13 terminating in connector 16.

The baffle 15 comprises a horizontally extending rectangular bottom portion 23 having upwardly extending flanges on each of the four edges thereof. The flanges 24 and 25 on the front and rear ends of the baffle need be only high enough to prevent spillage of any foodstuffs collecting thereon while the side flanges 26 and 27 are somewhat higher and terminate in channel-shaped portions 28 and 29. These channel-shaped portions are adapted to cooperate with opposed slide rails 31 and 32 secured respectively to the side walls of the oven in a horizontal position at a point intermediate the floor and top of the oven such that when the unit 12 is supported thereby, electrical contact of the heating element 13 can be made by means of connector 16, with the upper terminal block (not shown) mounted in the rear wall of the oven.

The means for detachably securing the front and rear ends of baffles to the heat shield 14 are more clearly shown in Figs. 2, 3, 4 and 6. The securing means at the rear end of the structure comprises a depending bracket 33 suitably secured to the shield 14 as by screws 34 and having a vertical portion 34A on which the connector 16 is mounted by means of bolts 35, this portion of the bracket being suitably apertured for the ends of the heating element 13. The lower end of the bracket terminates in a pair of forwardly-extending hook-shaped portions 36 and 37 adapted to pass through a pair of aligned slots 38 and 39 in the baffle and overlaps the bottom of the baffle adjacent said slots when the combined unit 12 is in the assembled state. The central portion of the lower edge of the bracket between the hook-shaped portions is cut away slightly as shown in Figs. 3 and 6 to provide a bearing surface 40 which engages a raised portion 41 of the baffle to limit space the baffle and shield the desired distance.

The securing means adjacent the forward end of the unit is designed to secure the baffle and shield together in spaced relationship and also to provide a biasing action which will maintain the hook-shaped portions 36 and 37 beneath the baffle when the unit is assembled. To obtain these results, there is provided a somewhat resilient bracket 46 in the form of a bent rod the flattened ends 47 of which are spaced apart and riveted to the bottom surface of the shield 14 some distance back of the forward edge of the shield. From the points of connection the rod forming bracket 46 extends forwardly and is then bent back upon itself to form opposed U-shaped portions 48 lying in vertical planes, these U-shaped portions being connected by the horizontal transversely extending part of the rod 49 having a horizontal yoke-shaped central portion 50 with the open side thereof facing rearwardly. In assembling the shield and baffle the hook-shaped ends 36 and 37 are inserted through slots 38 and 39 after which the forward ends of the baffle and shield are folded together until the yoke 50 comes into contact with the sloping forward side of the protuberance or boss 52 provided on the upper surface of the baffle. Due to the resiliency of the bracket resulting from its configuration, a slight pressure will force the transverse portion of the bracket downwardly and slightly forwardly along the sloping surfaces of boss 52 into or substantially into engagement with the flat surface of the baffle where it can be secured by a locking lever 53 pivotally secured by rivet 55 to the upper surface of the baffle. As is shown in Fig. 4, the lever 53 is in the form of a turn button, one end 54 of which is spaced from the upper surface of the baffle a sufficient distance to slide onto and firmly engage the top surface of the yoke 50 when the lever is rotated about its pivotal connection.

It will be observed that whether the heating unit 12 is rested on the floor of the oven with the heating element electrically connected to the terminal block 17 or is in the intermediate position supported by slide rails 31 and 32, the unit is supported by means of the baffle 15 which also constitutes the bottom side of the oven space being heated. As the heating unit can be removed from the oven and the baffle detached from the remaining parts of the unit, the present invention in effect provides in the form of baffle 15 a readily removal oven bottom which can be more easily cleaned of any foodstuffs which might become deposited thereon than is the case in the present oven structures in which the floor 18 of the oven directly underlies the heating element 13 when the latter is plugged into the terminal block corresponding to block 17. It will also be noted that the baffle including the flanges along the edges thereof are so shaped as substantially to cover or overlie the entire oven floor 18, the flanged edges of the baffle preventing spillage of any loose or liquid material on the baffle during removal of the assembly from the oven. Since the baffle is designed to rest on the floor 18 of the oven when the unit 13 is in the "full-oven" position, there is no problem of providing for separate storage thereof during those periods when the unit is not in the "speed-oven" position.

What we claim as new and desire to secure by Letters Patent of the United States is:

1. In combination with an oven including a top wall and a floor and a pair of opposed upstanding laterally spaced-apart side walls, a unitary heater removably arranged in a lateral position within said oven intermediate said top wall and said floor and comprising a heat shield having a substantially centrally located opening therein, a heating element attached to the lower surface of said heat shield, and a heat baffle spaced beneath said heating element and secured to said heat shield, said opening permitting the passage therethrough of downwardly moving air in the central portion of said oven, the space between said heat shield and said heat baffle guiding the downwardly moving air laterally into contact with said heating element and then deflecting the heated air laterally above the top of said heat baffle and upwardly in said oven adjacent to said side walls, whereby the effective oven compartment is defined above said heat baffle.

2. In combination with an oven including a top wall and a floor and a pair of opposed upstanding laterally spaced-apart side walls, a unitary heater removably arranged in a lateral position within said oven intermediate said top wall and said floor and comprising a heat shield having a substantially centrally located opening therein, a heat baffle spaced beneath said heat shield and secured thereto, and a heating element supported between said heat shield and said heat baffle, said opening permitting the passage therethrough of downwardly moving air in the central portion of said oven, the space between said heat shield and said heat baffle guiding the downwardly moving air laterally into contact with said heating element and then deflecting the heated air laterally above the top of said heat baffle and upwardly in said oven adjacent to said side walls, whereby the effective oven compartment is defined above said heat baffle.

3. In combination with an oven including a top wall and a floor and a pair of opposed upstanding laterally spaced-apart side walls, a unitary heater removably arranged in a lateral position within said oven intermediate said top wall and said floor and comprising a heat shield having a substantially centrally located opening therein, a heat baffle spaced beneath and substantially parallel to said heat shield, a heating element arranged between said heat baffle and said heat shield and attached to said heat shield, and means for detachably securing asid heat baffle to said heat shield, said opening permitting the passage therethrough of downwardly moving air in the central portion of said oven, the space between said heat shield and said heat baffle guiding the downwardly moving air laterally into contact with said heating element and then deflecting the heated air laterally above the top of said heat baffle and upwardly in said oven adjacent to said side walls, whereby the effective oven compartment is defined above said heat baffle.

4. In combination with an oven including a pair of opposed upstanding laterally spaced-apart side walls, a unitary heater removably arranged in a lateral position within said oven and comprising a heat shield having a substantially centrally located opening therein, a heating element secured to the lower side of said heat shield and surrounding said opening, a heat baffle spaced beneath said heating element and having a slot therein adjacent to one end thereof, a first bracket disposed adjacent to one end of said heat shield and adapted cooperatively to engage said slot in order detachably to secure said one end of said heat baffle to said one end of said heat shield, and means for removably securing the other end of said heat baffle to the adjacent other end of said heat shield, said means including a second bracket secured to the lower side of said heat shield and having an end portion adapted to engage said heat baffle and a turn button pivoted on said heat baffle, one end of said button being adapted to engage said second bracket in order normally to hold said other end of said heat baffle in position adjacent to said other end of said heat shield, said opening permitting the passage therethrough of downwardly moving air in the central portion of said oven, the space between said heat shield and said heat baffle guiding the downwardly moving air laterally into contact with said heating element and then deflecting the heated air laterally and upwardly in said oven adjacent to said side walls.

5. In combination with an oven including a floor and a pair of opposed upstanding laterally spaced-apart side walls and a pair of opposed laterally spaced-apart supports respectively mounted on said side walls above said floor, a unitary heater removably carried in a lateral position within said oven upon said supports and positioned above said floor and comprising a heat shield having a substantially centrally located opening therein, a heating element attached to the lower surface of said heat shield, and a heat baffle spaced beenath said heating element and secured to said heat shield, said opening permitting the passage therethrough of downwardly moving air in the central portion of said oven, the space between said heat shield and said heat baffle guiding the downwardly moving air laterally into contact with said heating element and then deflecting the heated air laterally above the top of said heat baffle and upwardly in said oven adjacent to said side walls.

6. In combination with an oven including a floor and a pair of opposed upstanding laterally spaced-apart side walls and a pair of opposed laterally spaced-apart supports respectively mounted on said side walls and positioned considerably above said floor, a unitary heater adapted to be removably carried in lateral positions within said oven either directly upon said floor or upon said supports considerably above said floor and comprising a heat shield having a substantially centrally located opening therein, a heating element attached to the lower surface of said heat shield, a heat baffle spaced beneath said heating element and secured to said heat shield, and means for establishing electrical contact with said heating element in either supported position of said heater, said opening permitting the passage therethrough of downwardly moving air in the central portion of said oven, the space between said heat shield and said heat baffle guiding the downwardly moving air laterally into contact with said heating element and then deflecting the heated air laterally above the top of said heat baffle and upwardly in said oven adjacent to said side walls regardless of the supported position of said heater.

7. In combination with an oven including a top wall and a floor and a pair of opposed upstanding laterally spaced-apart side walls, a unitary heater removably arranged in a lateral position within said oven intermediate said top wall and said floor and comprising a heat shield having a substantially centrally located opening therein, a heating element attached to said heat shield beneath the lower surface thereof, and a heat baffle detachably secured to said heat shield and spaced beneath said heating element, said opening permitting the passage therethrough of downwardly moving air in the central portion of said oven, the space between said heat shield and said heat baffle guiding the downwardly moving air laterally into contact with said heating element and then deflecting the heated air laterally above the top of said heat baffle and upwardly in said oven adjacent to said side walls, whereby the effective oven compartment is defined above said heat baffle, said heat baffle being provided with an upwardly directed rim providing a drip pan adapted to catch oven spillage through said opening.

HERMAN W. SCHULZE.
LELAND B. WILHELM.

REFERENCES CITED

The following references are of record in the file of this patent:

UNITED STATES PATENTS

| Number | Name | Date |
| --- | --- | --- |
| 424,922 | Capek | Apr. 1, 1890 |
| 1,835,602 | Kercher et al. | Dec. 8, 1931 |
| 2,024,386 | Phelps | Dec. 17, 1935 |
| 2,221,595 | Lockwood | Nov. 12, 1940 |
| 2,258,144 | Parr et al. | Oct. 7, 1941 |
| 2,442,900 | McCormick | June 8, 1948 |
| 2,466,409 | Gardes | Apr. 5, 1949 |